(12) United States Patent
Klein (10) Patent No.: US 11,400,863 B2
(45) Date of Patent: Aug. 2, 2022

(54) HITCH STEP

(71) Applicant: Robert E. Klein, Gresham, OR (US)

(72) Inventor: Robert E. Klein, Gresham, OR (US)

(*) Notice: Subject to any disclaimer, the term of this patent is extended or adjusted under 35 U.S.C. 154(b) by 121 days.

(21) Appl. No.: 17/068,204

(22) Filed: Oct. 12, 2020

(65) Prior Publication Data

US 2022/0111796 A1 Apr. 14, 2022

(51) Int. Cl.
*B60D 1/58* (2006.01)
*B60R 3/00* (2006.01)

(52) U.S. Cl.
CPC ............ *B60R 3/007* (2013.01); *B60D 1/58* (2013.01)

(58) Field of Classification Search
CPC .................. B60R 3/007; B60D 1/58
See application file for complete search history.

(56) References Cited

U.S. PATENT DOCUMENTS

| | | | |
|---|---|---|---|
| 8,851,495 B1* | 10/2014 | Masanek, Jr. .......... | B60R 3/007 280/166 |
| 2014/0333055 A1* | 11/2014 | Masanek, Jr. ........... | B60D 1/58 280/770 |
| 2015/0108733 A1* | 4/2015 | Masanek, Jr. .......... | B60R 3/007 280/163 |
| 2018/0111431 A1* | 4/2018 | MacNeil ................ | B60D 1/58 |
| 2019/0135062 A1* | 5/2019 | MacNeil ................ | B60D 1/58 |

* cited by examiner

*Primary Examiner* — Bryan A Evans
(74) *Attorney, Agent, or Firm* — Ingrid McTaggart

(57) ABSTRACT

The present invention relates to a hitch step that may be secured to a hitch receiver tube and which may support extremely heavy loads thereon.

19 Claims, 6 Drawing Sheets

FIG. 16

HITCH STEP

1. TECHNICAL FIELD

The present invention relates to hitch steps for attachment to a hitch receiver on a vehicle, and more particularly, the present invention provides a hitch step that is structured to withstand the weight requirements of supporting a large load placed on the hitch step.

2. BACKGROUND OF THE INVENTION

The present invention is particularly intended for use on vehicles which may include a hitch receiver secured to the frame of the vehicle, such as at the back end of the vehicle. Hitch receivers may be installed to secure a hitch ball for towing a trailer or the like. When the vehicle is not towing, the hitch receiver is not utilized. Many hitch receivers are secured at the rear bumper of trucks, wherein the operator may utilize the truck bed for hauling. An operator may commonly utilize the truck's rear bumper as a step to support themselves when climbing into the truck bed. However, the bumper may be positioned at a height above the ground that is not convenient for use as a step. There is a need, therefore, to provide a means to access a truck bed that is more convenient than stepping on a truck's rear bumper.

SUMMARY OF THE INVENTION

The present invention relates to a hitch step that may be secured to a hitch receiver to act as a step for accessing a vehicle, such as accessing the bed of a truck or a camper, or for accessing the roof of an SUV or an RV. The hitch step is structured to support extremely heavy loads that may be supported by the hitch step.

DETAILED DESCRIPTION OF THE PREFERRED EMBODIMENTS

Figure 1:
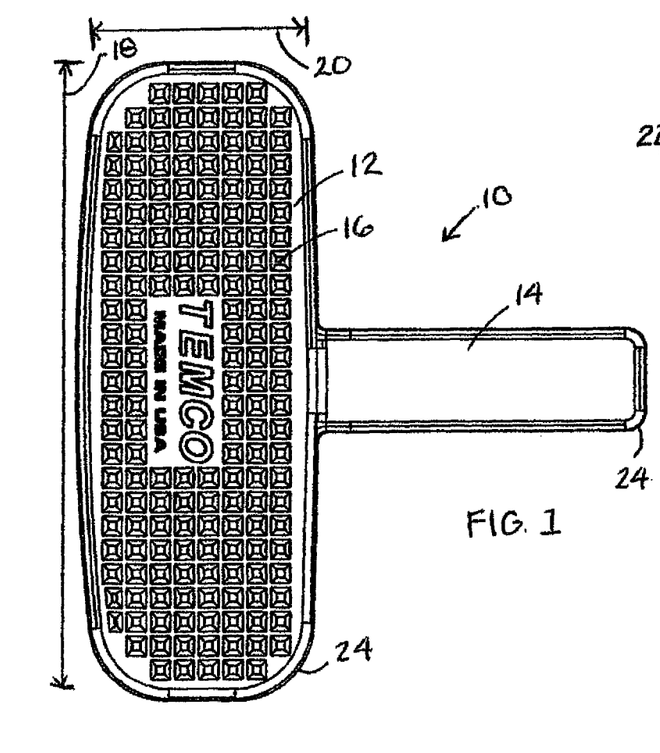
FIG. 1 is a top view of one example embodiment of a hitch step.
Figure 2:
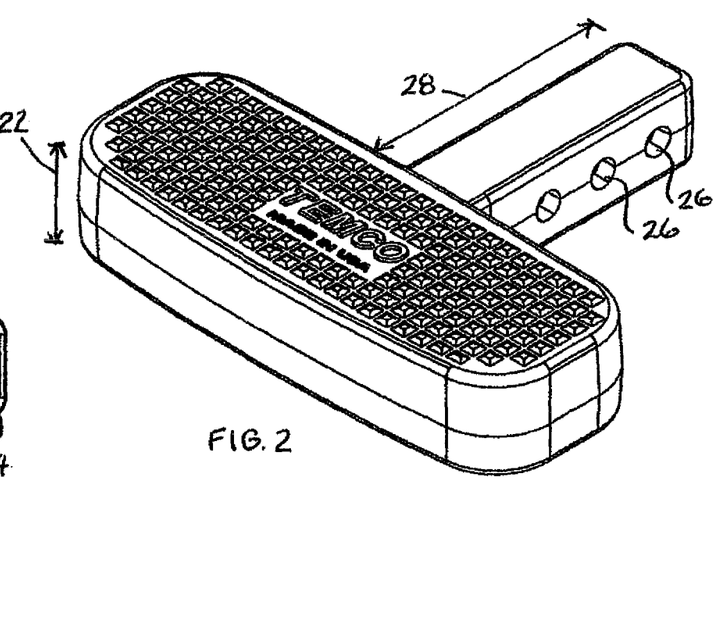
FIG. 2 is an isometric view of the hitch step of FIG. 1.

FIG. 1 is a top view of one example embodiment of a hitch step 10 including a platform 12 and an extension bar 14 secured thereto. Platform 12 may include raised regions 16 extending upwardly from platform 12 that act to channel water from platform 12 and function as gripping surfaces when the platform is stepped on. In the embodiment shown, platform 12 may define a length 18 of approximately 13 inches, a width 20 of approximately four and a half inches, and depth 22 of approximately two and a half inches (FIG. 2). However, platform 12 may include any dimensions that may be suitable for a particular embodiment. Hitch step 10 may be manufactured of any material that will provide the structural strength desired for a step, such as steel, and in a preferred embodiment is manufactured from a 360 series aluminum die cast alloy. Hitch step 10 may include rounded corners 24 on platform 12 and on extension bar 14.

FIG. 2 is an isometric view of the hitch step of FIG. 1 which includes multiple apertures 26 extending horizontally through extension bar 14. Multiple apertures 26 may be spaced along a length 28 of extension bar 14 so as to receive a hitch pin 32 (see FIG. 16) there through so as to secure the extension bar 14, and hitch step 10, within a hitch receiving tube 30 (see FIG. 16). Multiple apertures 26 allow the hitch step 10 to be secured to multiple types of hitch receiver tubes 30 that may include hitch pin apertures in different locations along a length of their hitch receiver tube 30 (FIG. 16), and may allow hitch step platform 12 to be positioned outwardly from a hitch receiver tube 30 at a desired distance.

Figures 3, 4, 5, 6, 7:
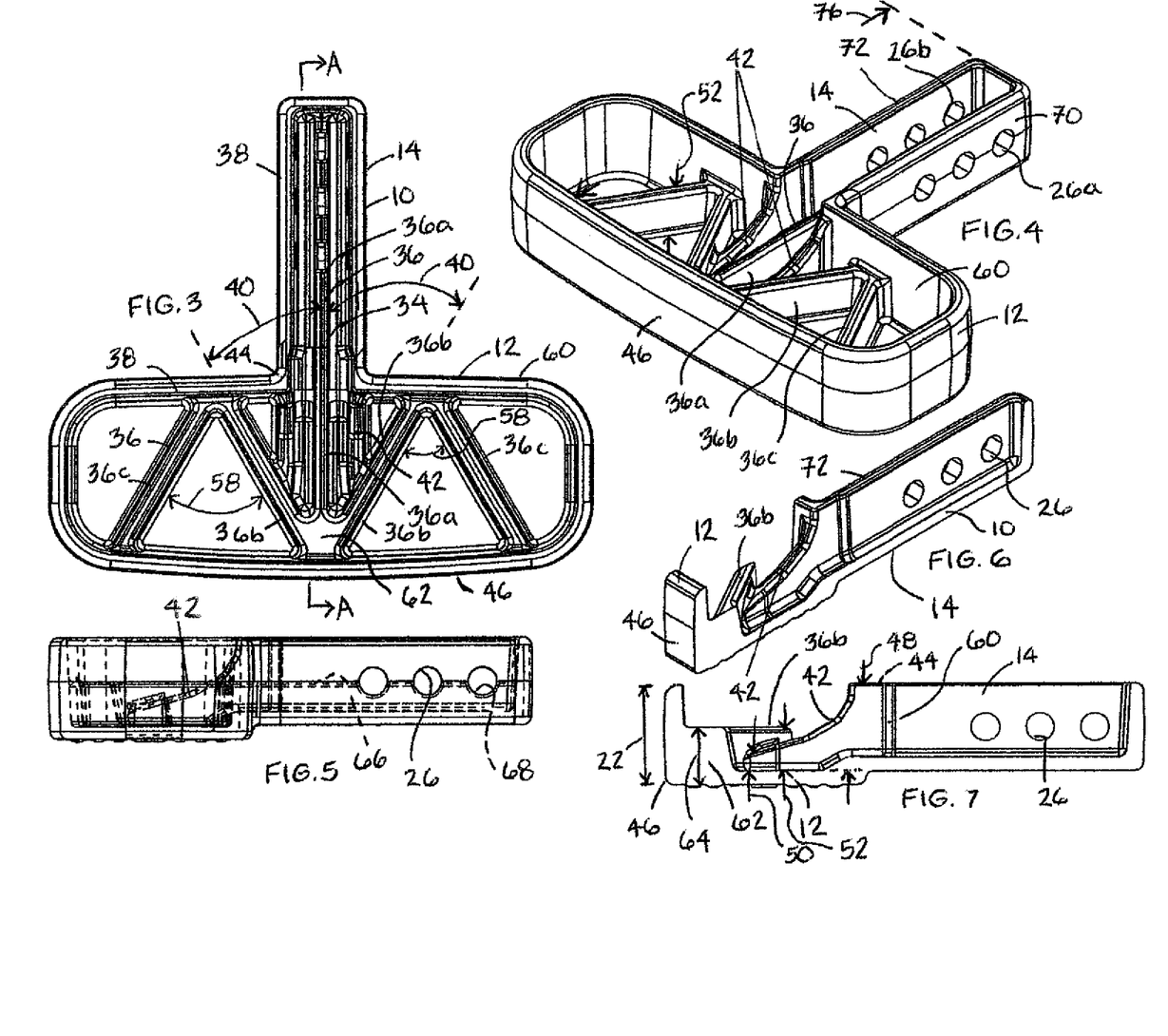
FIG. 3 is a bottom view of the hitch step of FIG. 1.
FIG. 4 is an isometric view showing the bottom of the hitch step of FIG. 1.
FIG. 5 is a side view of the hitch step of FIG. 1.
FIG. 6 is a cutaway isometric view of the hitch step of FIG. 3 taken along section line A-A.
FIG. 7 is a cutaway side view of the hitch step of FIG. 3 taken along section line A-A.

FIG. 3 is a bottom view of the hitch step 10 of FIG. 1 showing strengthening structure 34 extending there along. Strengthening structure 34 may include a rib 36 that extends along extension bar 14 and underneath platform 12. Rib 36, in the embodiment shown, is in the shape of an arrow and includes a first portion 36a that extends along an underside 38 of extension bar 14 and along an of underside 38 of platform 12. In the embodiment shown, first portion 36a is a continuous rib that runs straight down the center of hitch step 10. Rib 36 includes two second portions 36b that each extend at an angle 40 in a range of ten to forty five degrees, more particularly at an angle 40 in a range of twenty five to thirty five degrees, and approximately thirty degrees, with respect to first portion 36a of rib 36, and extends underneath platform 12 rearwardly toward extension bar 14.

Positioned within each angle 40 of first portion 36a and second portions 36b is another rib 42 that extends from a base region 44 of extension bar 14 toward a front edge 46 of platform 12. Ribs 42 have a height, or depth, 48 at base region 44 of extension bar 14 that is in a range of 80 to 100 percent of the depth 22 of base region 44. The ribs 42 are reduced in height as the ribs 42 extend toward front edge 46 of platform 12 so that ribs 42 define a height 50 where the ribs 42 contact and terminate at second portion 36b of rib 36, wherein height 50 is less than 50% of the height 52 of second portion 36b of rib 36. Rib 36 generally has a height 52 in a range of 40% to 50% of the depth 22 of platform 12, such that height 50 of ribs 42 where ribs 42 contact second portion 36b of rib 36 is less than 25% of depth 22. Accordingly, ribs 42 taper downwardly in height (as shown in this upside down view of hitch step 10) from base region 44 to second portion 36b of rib 36. The position of ribs 42 within each angle 40 defined by first region 36a and each of second regions 36b of rib 36, and the tapered slope of ribs 42 in this region, provide a strong support structure for platform 12 and extension bar 14 so that hitch step 10 may support extremely strong loads, such as when a person steps on hitch step 10. In other words, hitch step 10 may support the weight of a full grown man, carrying a heavy load, as the man steps on hitch step 10 and into a truck bed, for example.

Still referring to FIG. 3, hitch step 10 further includes two third portions 36c of rib 36 positioned on underside 38 of platform 12, wherein third portions 36c each define an angle 58 with respect to their corresponding second portion 36b. Angle 58 may be in the range of twenty to ninety degrees, more particularly in the range of fifty five to sixty five degrees, and in the embodiment shown is approximately sixty 20 degrees. Each of second portions 36b and each of third portions 36c extend from front edge 46 of platform 12 to a rear edge 60 of platform 12 and may define a height 52 that is in a range of forty to sixty percent of depth 22 of platform 12, as measured in a direction parallel to height 22.

Ribs 36 further define a solid region 62 where first portion 36a meets second portions 36b, adjacent to front edge 46 of platform 12. Solid region 62 has a depth 64 that extends the full depth 52 of ribs 36. Solid region 62, together with the arrow shaped rib 36 and tapered ribs 42 together define a robust and strong support for hitch step 10 so that the hitch step may support a weight of at least 500 pounds thereon, and may support a weight thereon as much as 1,000 pounds.

FIG. 4 is an isometric view showing the bottom of the hitch step 10 of FIG. 1. Two sets of apertures 26 are shown in extension bar 14, three apertures 26a on a first side 70 of extension bar 14 and three apertures 26b on a second side 72 of extension bar 14, wherein the three apertures 26a on first side 70 are aligned with the three apertures 26b on second side 72. The two sets of apertures 26 allow a hitch pin (FIG. 16) to be received therein so as to secure extension bar 14, and the hitch step 10, to a hitch receiver tube 30 (see FIG. 16).

FIG. 4 further shows ribs 42 tapering in height 48 from rear edge 60 of platform 12 toward a height 50 near front edge 46 of platform 12 wherein ribs 42 have height 48 (FIG. 7) of approximately the same dimension as depth 22 at rear edge 60 and depth 50 (FIG. 7) of approximately one quarter of depth 22 at the position where ribs 42 contact second regions 36b of rib 36. Rib 36, including portions 36a, 36b and 36c, is shown having depth 52 approximately half the depth 22 of hitch step 10, completely along a length 76 of rib 36, with the exception of half circular cutout regions 68 (see FIG. 5).

FIG. 5 is a side view of the hitch step 10 of FIG. 1. Extension bar 14 is shown having multiple apertures 26 extending there through. Apertures 26 extend through a top region 66 of first portion 36a of rib 36 so that first portion 36a includes three half circular cutout regions 68 that are each aligned with a corresponding aperture 26 in extension bar 14. In this manner a hitch pin 106 (see FIG. 16) may be positioned through aperture 26 of extension bar 14 without being blocked by first portion 36a of rib 36.

FIG. 6 is a cutaway isometric view of the hitch step 10 of FIG. 3 taken along section line A-A.

FIG. 7 is a cutaway side view of the hitch step 10 of FIG. 3 taken along section line A-A. Solid region 62, in this embodiment, is shown having depth 64 of greater than fifty percent of depth 22 of platform 12. Tapered rib 42 is shown having a height 48, or depth, at base region 44 of extension bar 14 that is at least eighty percent of the depth 22 of base region 44. The ribs 42 are reduced in height as the ribs 42 extend toward front edge 46 of platform 12 so that ribs 42 define a height 50 where the ribs 42 contact and terminate at second portion 36b of rib 36, wherein height 50 is less than fifty percent of the height 52 of second portion 36b of rib 36.

Rib 36 generally has a height 52 in a range of forty percent to fifty percent of the depth 22 of platform 12, such that height 50 of ribs 42 where ribs 42 contact second portion 36b of rib 36 is less than twenty five percent of depth 22.

Figure 8:
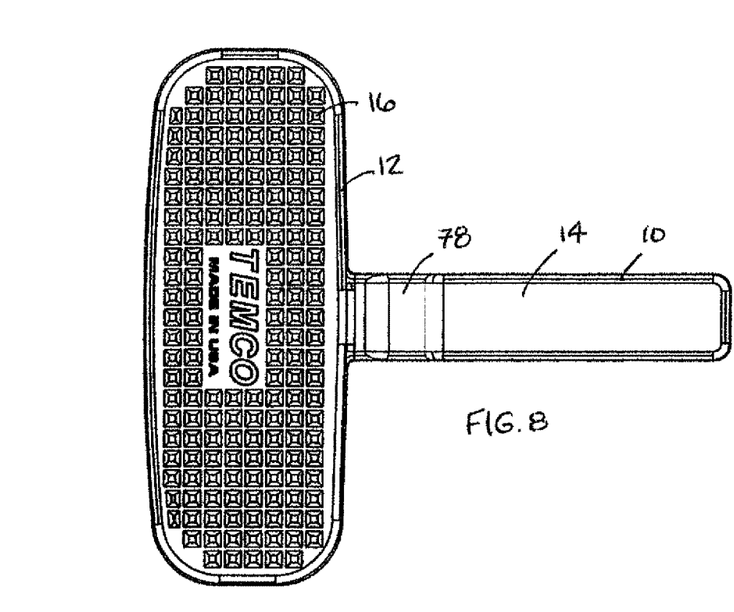
FIG. 8 is a top view of another example embodiment of a hitch step having a step down neck region.

FIG. 8 is a top view of another example embodiment of a hitch step 10 having a step down neck region 78.

Figures 9, 11:
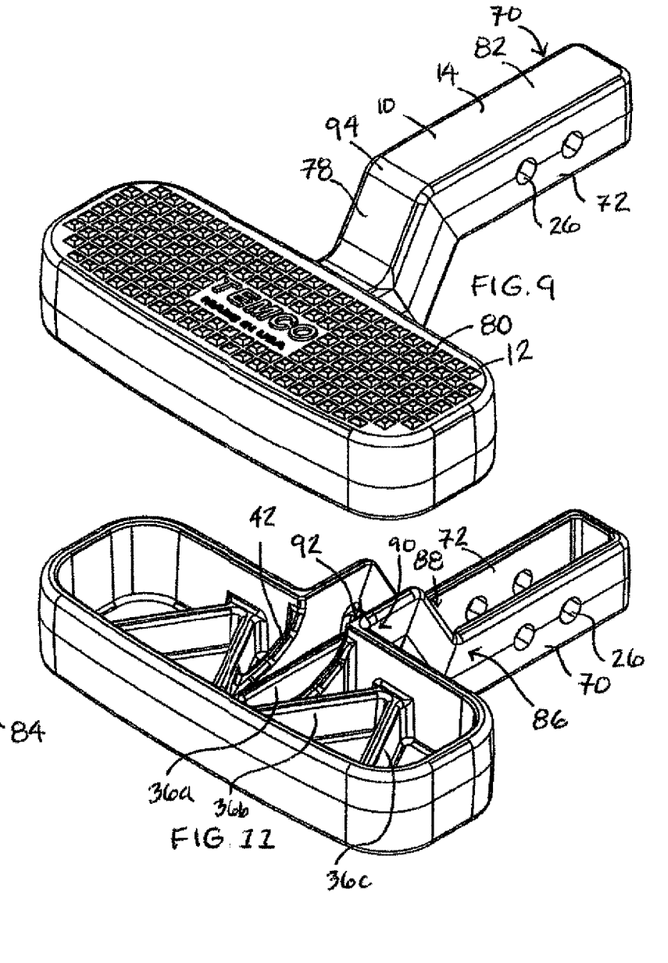
FIG. 9 is an isometric view showing the top of the hitch step of FIG. 8.
FIG. 11 is an isometric view showing the bottom of the hitch step of FIG. 8.
Figure 16:
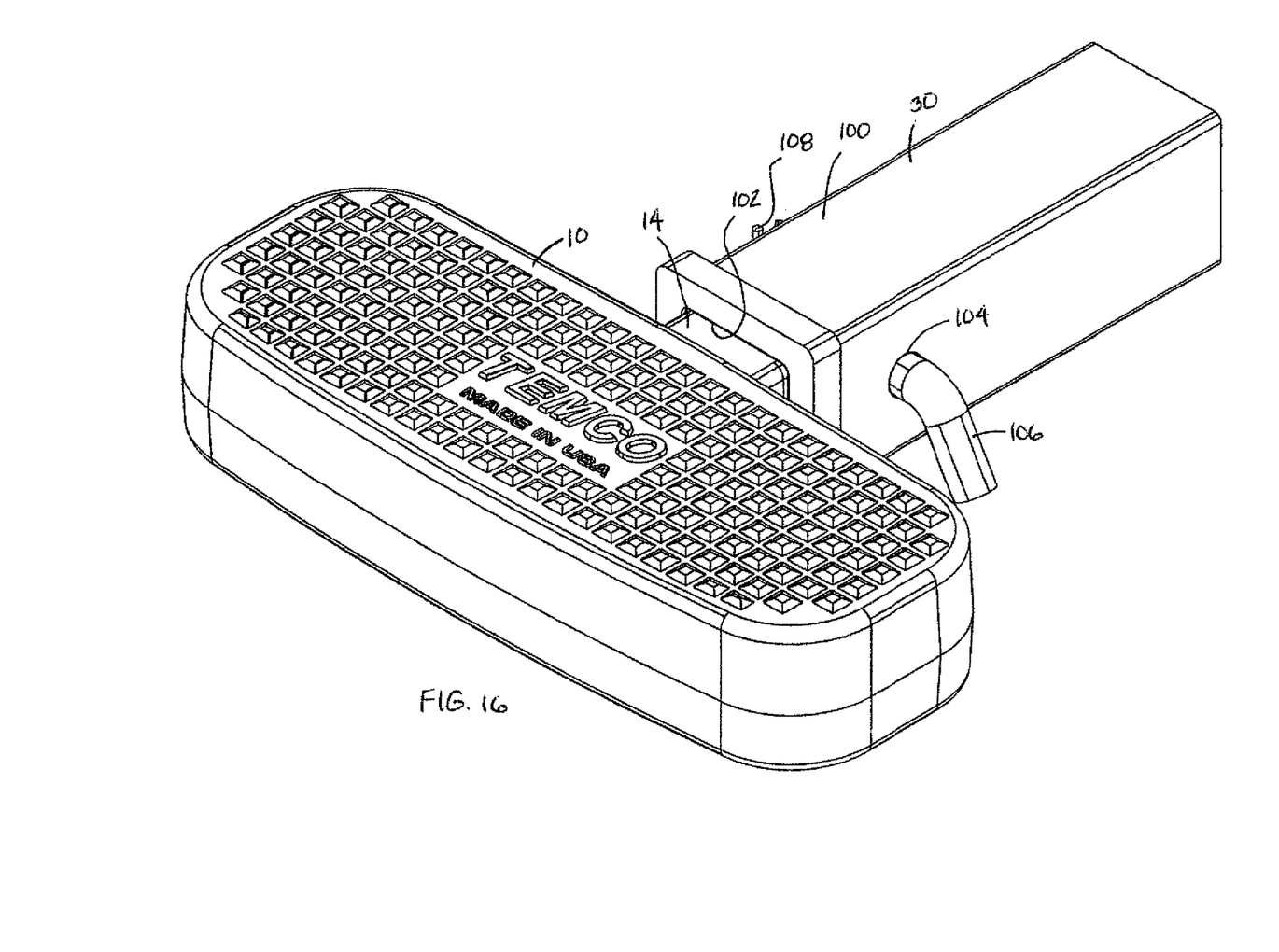
FIG. 16 is an isometric view of the hitch step of FIG. 1 installed in a hitch receiver.

FIG. 9 is an isometric view of the hitch step 10 of FIG. 8 showing step down neck region 78 which positions the top surface 80 of platform 12 lower than the top surface 82 of extension bar 14 when hitch step 10 is installed in a hitch receiver tube 30 (see FIG. 16). In this embodiment, extension bar 14 includes two sets of apertures 26 for receive a hitch pin 106 (see FIG. 16).

Figure 10:
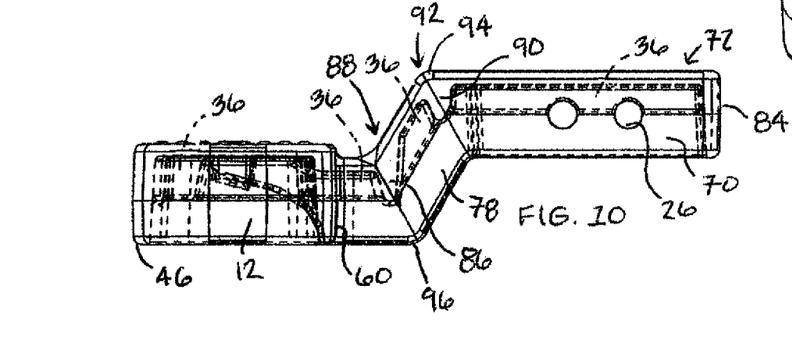
FIG. 10 is a side view of the hitch step of FIG. 8.

FIG. 10 is a side view of the hitch step 10 of FIG. 8 showing rib 36 extending continuously from front edge 46 of platform 12 to a rear surface 84 of extension bar 14. This view also shows first and third cross ribs 86 and 90 that extend from rib 36 to first side 70 of extension bar 14, and second and fourth cross ribs 88 and 92 that extend from rib 36 to second side 72 of extension bar 14. First cross rib 86 is positioned adjacent rear edge 60 of platform 12, between first side 70 of extension bar 14 and rib 36. Second cross rib 88 is positioned adjacent rear edge 60 of platform 12, between second side 72 of extension bar 14 and rib 36. Third cross rib 90 is positioned in a transition region 94 of extension bar 14, between first side 70 of extension bar 14 and rib 36. Fourth cross rib 92 is positioned in transition region 94 of extension bar 14, between second side 72 of extension bar 14 and rib 36. Cross ribs 86, 88, 90 and 92, in the embodiment shown, extend perpendicular to rib 36 and stabilize central rib 36 in the regions of central rib 36 where the central rib 36 has a change of direction, namely, in transition region 94 wherein extension bar 14 transitions into step down neck region 78, and in a transition region 96 where step down neck region 78 transitions into the rear edge 60 of platform 12. Cross ribs 86, 88, 90 and 92 each define a depth, or height, 98 that in the embodiment shown, corresponds to the height 52 of rib 36. The cross ribs 86, 88, 90 and 92 provide strength to hitch step 10 and reduce or prevent step down neck region 78 from deforming when large loads are supported on platform 12.

FIG. 11 is an isometric view showing the bottom of hitch step 10 of FIG. 8.

Figures 12, 13, 14, 15:
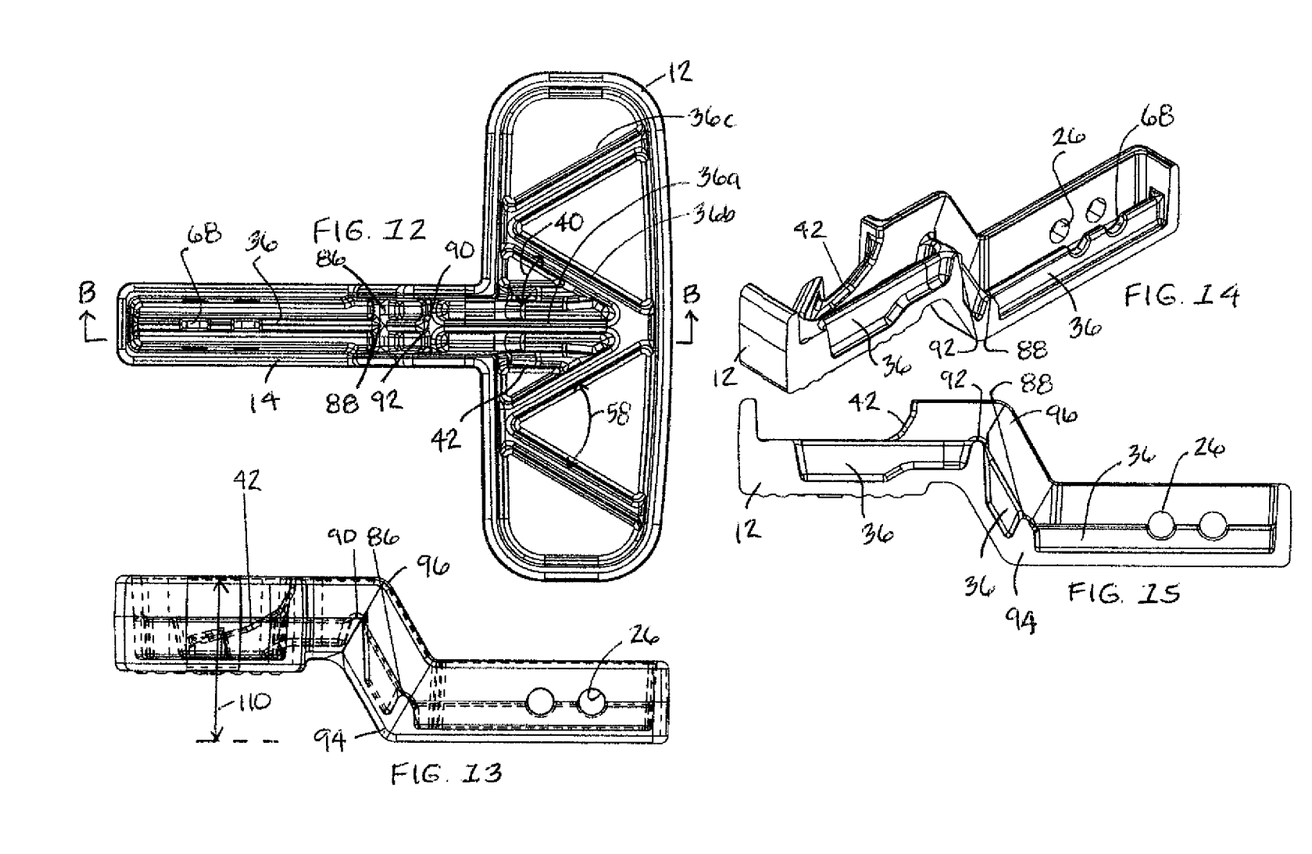
FIG. 12 is a bottom view of the hitch step of FIG. 8.
FIG. 13 is a side view of the hitch step of FIG. 8.
FIG. 14 is a cutaway isometric view of the hitch step of FIG. 12 taken along section line B-B.
FIG. 15 is a cutaway side view of the hitch step of FIG. 12 taken along section line B-B.

FIG. 12 is a bottom view of hitch step 10 of FIG. 8.

FIG. 13 is a side view of hitch step 10 of FIG. 8.

FIG. 14 is a cutaway isometric view of hitch step 10 of FIG. 8.

FIG. 15 is a cutaway side view of hitch step 10 of FIG. 8.

FIG. 16 is an isometric view of the hitch step 10 of FIG. 1 installed in a hitch receiver 100 that includes hitch receiving tube 30 that defines a hitch receiver opening 102 sized to receive extension bar 14 of hitch step 10. Hitch receiver 100 includes an aperture 104 aligned with one of apertures 26 (FIG. 2) of extension bar 14 when bar 14 is received within opening 102. A hitch pin 106 is placed through aperture 104 of hitch receiver 100 and through aperture 26 of hitch step 10, and is secured in place with a cotter pin 108, to secure the hitch step 10 to the hitch receiver 100. Hitch receiver 100 generally is secured to the back end of a vehicle (not shown).

Figure 17:
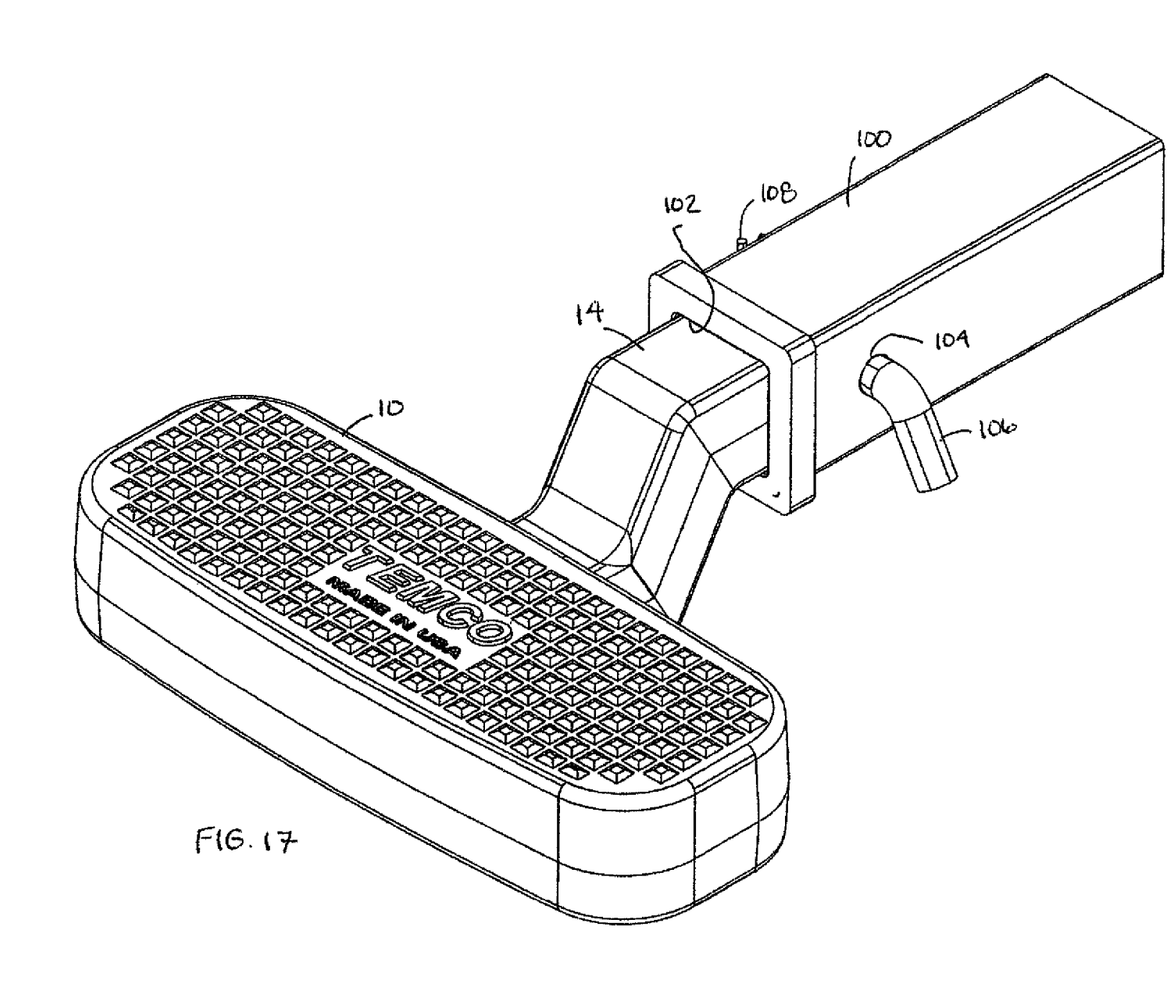
FIG. 17 is an isometric view of the hitch step of FIG. 8 installed in a hitch receiver.

FIG. 17 is an isometric view of the hitch step 10 of FIG. 8 installed in a hitch receiver 100. In this embodiment hitch step 10 may define an overall height 110 of approximately four inches (FIG. 13).

As may be understood from the above description and drawings, the present invention has many advantages. In the above description numerous details have been set forth in order to provide a more thorough understanding of the present invention. It will be obvious, however, to one skilled in the art that the present invention may be practiced using other equivalent designs.

I claim:

1. A hitch step assembly, comprising:
a platform having a top surface that defines a step;
an extension bar secured to and extending outwardly from said platform;
a support rib that includes a first portion, a second portion and a third portion, said first portion of said support rib extending along an underside of said extension bar and along an underside of said platform, said second portion of said support rib extending along an underside of said platform and defining an angle in a range of twenty five to thirty five degrees with respect to said first portion of said support rib, and said third portion of said support rib extending along an underside of said platform and defining an angle in a range of fifty five to sixty five degrees with respect to said second portion of said support rib; and
wherein said platform defines a platform height and wherein said support rib defines a rib height less than fifty percent of said platform height.

2. The hitch step assembly of claim 1 further comprising a fourth portion and a fifth portion of said support rib, said fourth portion of said support rib extending along an underside of said platform and defining an angle in a range of twenty five to thirty five degrees with respect to said first portion of said support rib, and said fifth portion of said support rib extending along an underside of said platform and defining an angle in a range of fifty five to sixty five degrees with respect to said fourth portion of said support rib, wherein said fourth and fifth portions of said support rib are positioned opposite said first portion of said support rib from said second and third portions of said support rib.

3. The hitch step assembly of claim 1 wherein said platform defines a rear surface positioned adjacent said extension bar, said assembly further comprising a support member positioned on an underside of said platform, said support member extending from rear surface of said platform to said second portion of said support rib.

4. A hitch step assembly, comprising:
a platform having a top surface that defines a step;
an extension bar secured to and extending outwardly from said platform;
a support rib that includes a first portion, a second portion and a third portion, said first portion of said support rib extending along an underside of said extension bar and along an underside of said platform, said second portion of said support rib extending along an underside of said platform and defining an angle in a range of twenty five to thirty five degrees with respect to said first portion of said support rib, and said third portion of said support rib extending along an underside of said platform and defining an angle in a range of fifty five to sixty five degrees with respect to said second portion of said support rib;
wherein said platform defines a rear surface positioned adjacent said extension bar, said assembly further comprising a support member positioned on an underside of said platform, said support member extending from rear surface of said platform to said second portion of said support rib; and
wherein said support member defines a first height at said rear surface of said platform and a second height at said second portion of said support rib, wherein said first height of said support member is greater than said second height of said support member.

5. The hitch step assembly of claim 4 wherein said support member defines a top surface that tapers from said first height to said second height.

6. A hitch step assembly, comprising:
a platform having a top surface that defines a step;
an extension bar secured to and extending outwardly from said platform;
a support rib that includes a first portion, a second portion and a third portion, said first portion of said support rib extending along an underside of said extension bar and along an underside of said platform, said second portion of said support rib extending along an underside of said platform and defining an angle in a range of twenty five to thirty five degrees with respect to said first portion of said support rib, and said third portion of said support rib extending along an underside of said platform and defining an angle in a range of fifty five to sixty five degrees with respect to said second portion of said support rib;
wherein said platform defines a rear surface positioned adjacent said extension bar, said assembly further comprising a support member positioned on an underside of said platform, said support member extending from rear surface of said platform to said second portion of said support rib; and
wherein said support member is positioned parallel to said first portion of said support rib on said underside of said platform.

7. A hitch step assembly, comprising:
a platform having a top surface that defines a step;
an extension bar secured to and extending outwardly from said platform;
a support rib that includes a first portion, a second portion and a third portion, said first portion of said support rib extending along an underside of said extension bar and along an underside of said platform, said second portion of said support rib extending along an underside of said platform and defining an angle in a range of twenty five to thirty five degrees with respect to said first portion of said support rib, and said third portion of said support rib extending along an underside of said platform and defining an angle in a range of fifty five to sixty five degrees with respect to said second portion of said support rib;
wherein said platform defines a rear surface positioned adjacent said extension bar, said assembly further comprising a support member positioned on an underside of said platform, said support member extending from rear surface of said platform to said second portion of said support rib; and
wherein said support member comprises a first support member, said assembly further comprising a second support member positioned opposite said first portion of said support rib from said first support member, said second support member extending from said rear surface of said platform to a fourth portion of said support rib.

8. The hitch step assembly of claim 7 wherein said second support member defines a first height at said rear surface of said platform and a second height at said fourth portion of said support rib, wherein said first height of said second support member is greater than said second height of said second support member.

9. A hitch step assembly, comprising:
a platform that defines a platform underside surface, a rear surface and a front surface;

an extension bar secured to said platform at said rear surface; and a first support member that extends along said platform underside surface from said rear surface and toward said front surface of said platform, said first support member defining a height raised from said platform underside surface, wherein said height tapers downwardly from said rear surface toward said front surface of said platform.

10. The hitch step assembly of claim 9 further comprising a second support member that extends along said platform underside surface from said rear surface and toward said front surface, said second support member defining a height above said platform underside surface, wherein said second support member height tapers downwardly from said rear surface toward said front surface of said platform, and wherein said second support member is positioned parallel to said first support member.

11. The hitch step assembly of claim 10 wherein said extension bar defines a bar underside surface, said assembly further comprising a first support rib that extends along said bar underside surface and said platform underside surface between said first and said second support members.

12. The hitch step of claim 11 further comprising a second support rib, said second support rib extending along said platform underside surface and defining an angle in a range of twenty five to thirty five degrees with respect to said first support rib, wherein said first support member is positioned within said angle and between said first and said second support ribs.

13. The hitch step of claim 12 further comprising a third support rib, said third support rib extending along said platform underside surface and defining a second angle in a range of twenty five to thirty five degrees with respect to said first support rib, said third support rib positioned opposite said first support rib from said second support rib, wherein said second support member is positioned within said second angle and between said first and said third support ribs.

14. The hitch step assembly of claim 13 further comprising a fourth support rib and a fifth support rib, said fourth support rib extending along said platform underside surface and defining an angle in a range of fifty five to sixty five degrees with respect to said second support rib, and said fifth support rib extending along said platform underside surface and defining an angle in a range of fifty five to sixty five degrees with respect to said third support rib, wherein said fourth support rib is positioned opposite said second support rib from said first support rib and said fifth support rib is positioned opposite said third support rib from said first support rib.

15. The hitch step assembly of claim 12 wherein said platform defines a platform height, wherein said first support member extends from said rear surface of said platform to said second support member, wherein a first support member first height at said rear surface of said platform is greater than eighty percent of said platform height, and wherein a first support member second height at said second support member is less than twenty five percent of said platform height.

16. A hitch step assembly, comprising:
a platform having a top surface that defines a step and a platform underside surface;
an extension bar secured to and extending outwardly from said platform, said extension bar defining a bar underside surface;
a plurality of support ribs positioned on said platform underside surface, said plurality of support ribs defining a support rib height measured from said platform underside surface, wherein said support rib height is constant completely along said platform underside surface, and wherein said support rib height is in a range of forty to fifty percent of a height of said platform; and
a plurality of support members positioned on said platform underside surface, said plurality of support members defining a support member height that tapers from a first end of each of said support members to a second end of each of said support members, said support member height at said first end at least eighty percent of said platform height and said support member height at said second end at most twenty five percent of said platform height.

17. The hitch step assembly of claim 16 wherein said plurality of support ribs includes a first rib, a second rib and a third rib, said first rib extending continuously along said platform underside surface and along said bar underside surface, said second rib extending along said platform underside surface and defining a first angle in a range of twenty five to thirty five degrees with respect to said first rib, and said third rib extending along said platform underside surface and defining a second angle in a range of fifty five to sixty five degrees with respect to said second rib.

18. The hitch step assembly of claim 17 wherein said plurality of support ribs includes a fourth rib and a fifth rib, said fourth rib extending along said platform underside surface and defining a third angle in a range of twenty five to thirty five degrees with respect to said first rib, and said fifth rib extending along said platform underside surface and defining a fourth angle in a range of fifty five to sixty five degrees with respect to said fourth rib.

19. The hitch step assembly of claim 18 wherein said plurality of support members define a first support member positioned between said first and second ribs, and a second support member positioned between said first and fourth ribs.

* * * * *